Aug. 28, 1962  H. L. HARTZELL ETAL  3,051,393
VEHICLE HEATING SYSTEM
Filed Oct. 6, 1958
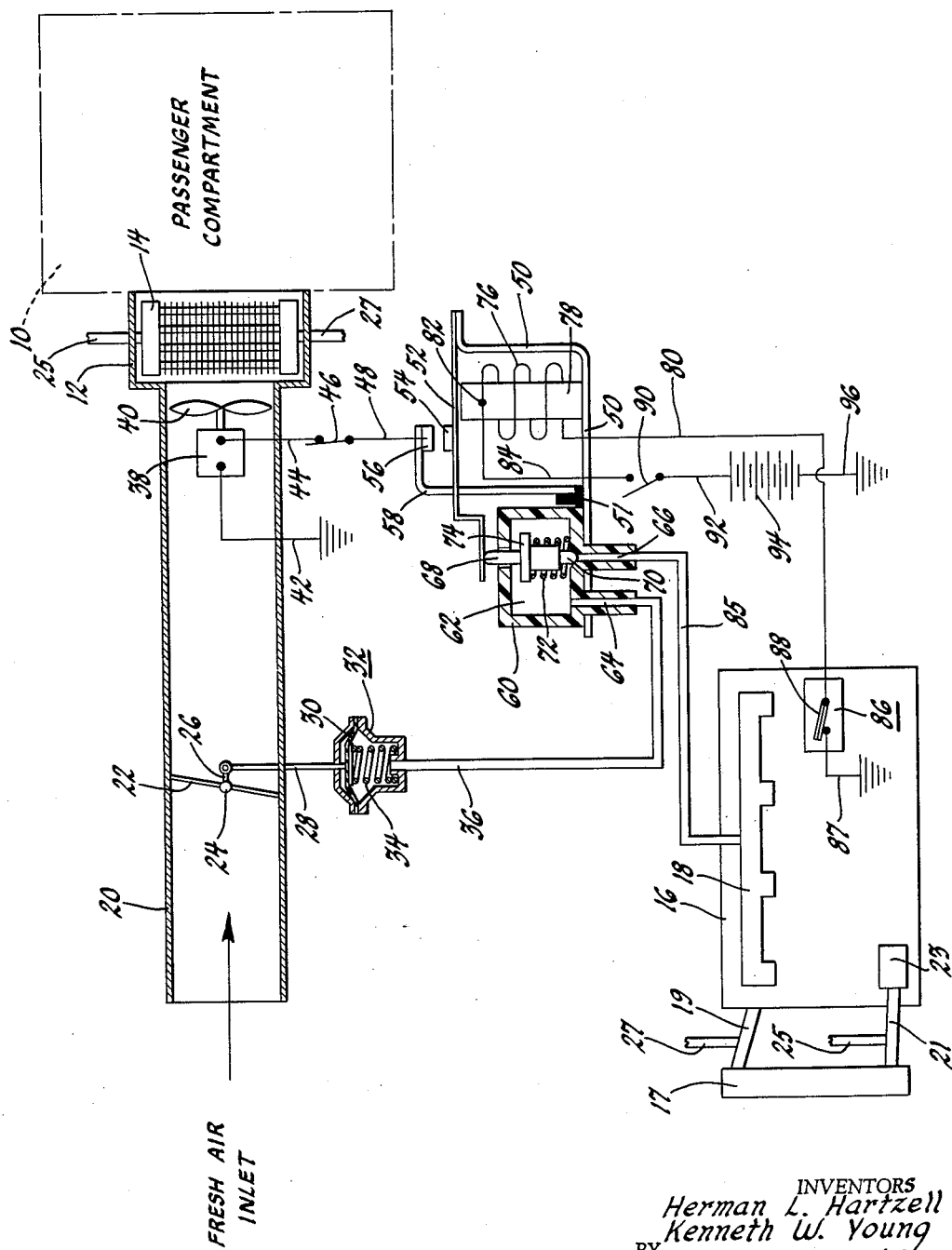
INVENTORS
Herman L. Hartzell
Kenneth W. Young
BY
THEIR ATTORNEY

United States Patent Office 3,051,393
Patented Aug. 28, 1962

3,051,393
VEHICLE HEATING SYSTEM
Herman L. Hartzell and Kenneth W. Young, Anderson, Ind., assignors to General Motors Corporation, Detroit, Mich., a corporation of Delaware
Filed Oct. 6, 1958, Ser. No. 765,388
4 Claims. (Cl. 237—2)

This invention relates to vehicle heating systems and more particularly to automatic control systems for controlling the heating of the passenger compartment of a motor vehicle.

In present day heating systems for motor vehicles such as passenger cars, the heating of the passenger compartment of the vehicle is generally achieved through a heat radiator that is fed with engine cooling fluid such as water. The radiator or heater heats a quantity of air that is circulated into the passenger compartment by means of an electric motor driven fan or blower and this air may come from either the passenger compartment itself or may be fresh air from the atmosphere.

In the sort of heating system described, certain difficulties have arisen in that the operator of the vehicle frequently does not know exactly when to turn on the fan motor to achieve comfortable heating of the passenger compartment. Thus in many instances, the fan motor is turned on before the engine cooling liquid has become hot enough to effect comfortable heating of the vehicle. In addition, the operator may have difficulty in judging when to admit fresh air to be heated by the heat radiator.

It is, accordingly, an object of this invention to provide an automatic heating system for a passenger car wherein the fan motor and the entry of fresh air to the heating system are controlled as a function of engine cooling fluid temperature. With this system, the fan motor and operation of the fresh air dampers are not left to the guess work of the operator but are automatically controlled to provide comfortable heating of the passenger compartment.

A more specific object of this invention is to provide a heating system for a vehicle including a fan motor and a fresh air damper and wherein the fan motor is energized and the damper opened when the engine cooling fluid temperature reaches a predetermined value.

A further object of this invention is to provide a heating system for a vehicle including a fan motor and a fresh air damper and wherein the fan motor and damper are controlled by a single relay that is only energized during the time that the engine is cold.

Another object of this invention is to provide a heating system for a vehicle including a fan motor and a fresh air damper and wherein the fan motor is energized through a circuit that is controlled by a relay and wherein the damper is operated through a vacuum motor that is controlled by the relay.

Still another object of this invention is to provide a combined electrical and fluid motor controller that includes an electromagnetic coil and a movable armature for controlling an electric circuit and a fluid or hydraulic circuit.

Further objects and advantages of the present invention will be apparent from the following description, reference being had to the accompanying drawings wherein a preferred embodiment of the present invention is clearly shown.

In the drawings:

The single FIGURE drawing illustrates a heating system made in accordance with this invention.

Referring now to the drawing, the passenger compartment of a motor vehicle is generally designated by reference numeral 10. The passenger compartment is in communication with a duct 12 which contains a conventional hot water heater or radiator 14. The heat exchanger 14 is connected with the engine cooling system of an internal combustion engine designated by reference numeral 16 and having an intake manifold 18. The engine 16 and heater 14 are connected in a conventional manner so that the cooling medium used to cool the engine is supplied to the heater 14 to heat the air surrounding the radiator. Thus as shown on the drawing, the conventional cooling system includes a radiator 17 that is connected with the water jacket of the engine via a conduit 19. A conduit 21 is connected with a water pump 23 that has its outlet side connected with the water jacket and which pumps water through the water jacket and through conduit 19 into the radiator 17. The conduit 21 is connected with a conduit 25 which is in turn connected to the outlet side of the heater coils 14. The inlet side of the heater 14 is connected with a conduit 27 which is in turn connected with conduit 19. It thus will be readily apparent to those skilled in the art that water or other engine cooling liquid is pumped from the cooling system of the engine in a conventional manner through the hot water heater 14 and then back to the engine cooling system. The conduits 25 and 27 are shown cut away in the drawings, but it is understood that they are connected.

The duct 12 is connected with an elongated duct 20 which forms a fresh air inlet duct for the heating system. A damper 22 is disposed within the duct 20 and may be pivoted in the duct by means of a rod 24. A lever 26 is connected with the rod 24 and this lever is in turn pivotally connected with a lever 28. The lever 28 is connected with the diaphragm 30 of a conventional vacuum motor generally designated by reference numeral 32. The vacuum motor contains a spring 34 which moves the diaphragm 30 to the position illustrated in the drawings and also moves the damper 22 to its closed position illustrated in the drawing. The interior of the vacuum motor is connected with a pipe 36 as is clearly illustrated in the drawing.

Positioned between the damper 22 and the heat radiator 14 is an electric motor 38 which drives a blower or fan 40. When the blower fan is operating, it blows air over the heat radiator 14 and into the passenger compartment 10 to supply heated air thereto. The blower motor 38 has one terminal thereof connected directly to ground via lead 42 and has another terminal connected with lead 44. The lead 44 is connected to one side of a heater switch 46 with the opposite side of the heater switch being connected with lead 48.

A combined electric and fluid circuit controller is provided which includes a relay having a frame 50 that pivotally supports an armature 52. The frame 50 is formed of metal material and the armature 52 is preferably formed of spring metal material so that it has inherent resilience. The armature 52 carries an electrical contact 54 which cooperates with an electrical contact 56 carried by a second frame member 58 that is riveted or otherwise secured to the main frame member 50 and which is insulated therefrom by insulator 51. The contact 56 is connected with lead wire 48 as shown. A valve device including a housing 60 formed of insulating material is supported by the lower portion of main frame 50. This valve device has a chamber 62 which is connected with ports 64 and 66. A movable valve member 68 is positioned within chamber 62 and has an end portion 70 that at times closes off the port 66. A spring 72 is positioned between the lower wall of housing and a spring retaining portion 74 formed integrally with the valve member 68. This valve member may be formed of any suitable metal or plastic material.

A relay coil winding 76 is wound on a metal core 78 that is supported by the frame 50 and is in electrical contact therewith. One side of the coil winding 76 is connected with lead wire 80 whereas the opposite side thereof is connected with junction point 82 which is in turn connected to the metal core 78 and is thus in electrical contact with frame 50 and armature 52. The junction 82 is also connected with a lead wire 84 as is clearly apparent from an inspection of the drawing.

When the relay coil 76 is deenergized, the spring 72 forces the armature 52 upwardly to a position wherein the contact 54 engages the contact 56. In this position of the combined electric and fluid circuit controller, the valve 68 is of course in a position to open the port 66 to the chamber 62 and port 64. It thus is apparent that with the relay coil 76 deenergized the port 66 is opened to the chamber 62 and the contacts 54 and 56 are in engagement. The spring 72 thus operates to open the valve and also operates to move armature 52 to its normal position wherein contacts 56 and 54 are engaged. When the relay coil 76 is energized, the armature 52 is attracted to open contacts 54 and 56 and forces valve 68 to a position wherein it closes communication between port 66 and chamber 62.

The port 64 of the fluid control device is connected with pipe 36 whereas the port 66 is connected with a pipe 85. The pipe 85 is connected with the intake manifold 18 of the engine and thus this pipe is subjected to vacuum or suction pressure during the time that the engine is operating.

The lead wire 80 that is connected to relay actuating coil 76 is connected to one side of a switch generally designated by reference numeral 86. This switch includes a bimetal contactor 88 formed of bimetallic material which completes a circuit between lead wire 80 and a lead wire 87 that is grounded whenever the bimetal contactor is in a closed position shown. The bimetal contactor 88 is so positioned as to sense the water jacket temperature of the engine and thus may be contained in a bulb that is threaded into the water jacket of the engine as is well known to those skilled in the art. The bimetal contactor 88 will open switch 86 whenever the water or cooling fluid temperature has reached a predetermined value and this value is set to be of a value that will cause comfortable heating of the passenger compartment 14. It thus will be appreciated that during warmup of the engine 16, the switch 86 will be closed to complete a circuit between lead wire 80 and ground and further that this switch will open when the cooling fluid has reached a value sufficient to cause comfortable heating of the passenger compartment through radiator 14.

The lead wire 84 is connected to one side of an ignition switch 90 as is illustrated in the drawing. The opposite side of ignition switch 90 is connected with a lead 92 which is in turn connected to one side of storage battery 94. The opposite side of storage battery 94 is connected directly to ground via a lead 96.

When the engine of the motor vehicle is initially started, the switch 88 will be closed unless the engine has been previously run and is already warmed up. Assuming that the engine has initially been started cold, the switch 86 will be closed to complete an energizing circuit for relay actuating coil 76 from battery 94, through ignition switch 90, through lead 84, through relay coil 76, through lead 80 and thence through switch 86 to ground. With relay coil 76 energized, the armature 52 is pulled downwardly to cause valve 68 to close communication between port 66 and chamber 62 and to open contacts 54 and 56. Thus, during warm up of the engine, the damper 22 will be maintained closed by spring 34 and the electric motor 38 will be deenergized due to the open position of contacts 54 and 56. After the engine warms up to a temperature wherein the cooling medium is sufficient to cause comfortable heating of the passenger compartment through heating coil or radiator 14, the switch 86 will open thus causing a deenergizing of relay coil 76. With relay coil 76 deenergized, the spring 72 forces valve 68 upwardly to a position wherein the spring retaining portion 74 engages the upper wall of the housing 60 and the spring 72 will also cause contacts 54 and 56 to be engaged. The stem of valve 68 has some clearance with the top wall of housing 60 to provide a vent to the atmosphere and this vent is closed by portion 74 when the valve 68 is moved by spring 72 to its up position. With contacts 54 and 56 in engagement, and assuming that heater switch 46 is closed, the heater motor 38 will be energized via a circuit that includes battery 94, switch 90, lead 84, junction 82, core 78, frame 50, armature 52, contacts 54 and 56, lead 48, heater switch 46, and lead 44. Simultaneously with the energizing of the motor 38, the damper 22 will be moved to an open position for at this time, the ports 64 and 66 are in communication to supply vacuum pressure from pipe 85 to the interior of vacuum motor 32 thus causing the diaphragm 30 to pull downwardly against the force of spring 34. The blower motor will thus be energized and fresh air will be admitted to the heating system only after the engine water or cooling medium temperature has reached a predetermined value and this condition of operation will continue as long as the cooling medium is sufficiently hot to maintain switch 86 in an open position and as long as ignition switch 90 and heater switch 46 are closed.

From the foregoing, it will be clearly apparent that an automatic control system has been devised which controls both the operation of the blower motor and the admitting of fresh air to the heating system. It will be observed that the damper is controlled by the suction pressure available in the intake manifold of the internal combustion engine and that the relay coil 76 is only energized during the warm up period of the engine. Thus, the automatic control is effected economically and operates to provide for comfortable heating of the passenger compartment in an automatic manner.

While the embodiment of the present invention as herein disclosed constitutes a preferred form, it is to be understood that other forms might be adopted.

What is claimed is as follows:

1. In combination with a motor vehicle having a fluid cooled internal combustion engine and a passenger compartment, said engine having an intake manifold, the combination comprising, a cooling system for said engine, a chamber having one end thereof located in communication with said passenger compartment and having an inlet side located in communication with the atmosphere, a fluid heated radiator positioned within said chamber immediately adjacent said passenger compartment, means connecting said radiator and said cooling system whereby said radiator is supplied with fluid medium from said cooling system, a motor driven blower positioned in said chamber between the inlet side thereof and said radiator, a damper positioned in said chamber between said inlet side thereof and said blower, a vacuum motor including a diaphragm and a spring for urging said diaphragm in one direction, means connecting said diaphragm with said damper, said spring normally maintaining said damper in a closed position, a duct connecting said vacuum motor with a valve block, means connecting the opposite side of said valve block with said intake manifold of said internal combustion engine, a relay including an actuating coil and a movable armature, a pair of contacts one of which is carried by said armature adapted to be opened and closed by movement of said armature, a valve positioned within said valve block and operated by said armature, said valve controlling the connection of said vacuum motor with said intake manifold, an electric circuit for said relay actuating coil including a thermostatic switch that is responsive to engine cooling medium temperature, said thermostatic switch being normally closed and being adapted to open when the temperature of said engine cooling medium exceeds a predetermined value, an electric circuit for said blower motor including said relay switch contacts, and means for energizing said relay actuating coil including said thermostatic switch, said actuating coil when energized causing the opening of said relay contacts and a closing of said valve and when deenergized, causing the closing of said relay contacts and the opening of said valve.

2. In combination with a motor vehicle having a fluid cooled internal combustion engine and a passenger compartment, said engine having an intake manifold, the combination comprising, a fluid heated radiator, a cooling system for said engine, means connecting said cooling system and said radiator whereby said radiator is supplied with fluid medium from said cooling system, a duct having one end thereof in communication with the atmosphere and having an opposite end thereof in communication with said radiator, an electric motor driven fan in said duct for forcing air over said radiator and into said passenger compartment, said duct connecting the passenger compartment of said motor vehicle with the atmosphere, a damper controlling the flow of fresh air through said duct, a vacuum motor connected with said damper for maintaining said damper closed when it is disconnected from said intake manifold and for causing an opening of said damper when said vacuum motor is connected with said intake manifold, valve means operative to connect said vacuum motor with said intake manifold, a relay including an actuating coil and a movable armature, an electric circuit for said actuating coil including a thermostatic switch positioned to sense the temperature of the fluid medium of said cooling system, said thermostatic switch being normally closed and being adapted to open when the fluid medium of said cooling system reaches a predetermined temperature, an electric circuit for said electric motor including switch contacts controlled by said relay armature, means mechanically connecting said relay armature and said valve means, said relay operating to open said valve means and close said switch contacts when said relay coil is deenergized and operating to open said switch contacts and close said valve means when said relay coil is energized.

3. In combination with a motor vehicle having a fluid cooled internal combustion engine and a passenger compartment, said engine having an intake manifold, the combination comprising, a fluid heated radiator, a cooling system for said engine, means connecting said cooling system and said radiator whereby said radiator is supplied with fluid medium from said cooling system, a duct having one end thereof in communication with the atmosphere and having an opposite end thereof in communication with said radiator, said duct communicating with said passenger compartment, an electric motor driven fan in said duct for forcing air over said radiator and into said passenger compartment, a damper controlling the flow of fresh air through said duct, a vacuum motor mechanically connected with said damper, valve means connecting said vacuum motor with said intake manifold of said internal combustion engine, a relay including an actuating coil and a pair of contacts, a thermostatic switch positioned to sense the temperature of the fluid medium of said cooling system and being closed when said temperature is below a predetermined value and being adapted to open when said temperature is above a predetermined value, a source of voltage, means connecting said relay actuating coil in an electric circuit with said thermostatic switch and said source of voltage, means connecting said electric motor in circuit with said voltage source and in circuit with said relay contacts, said relay coil when energized being adapted to open said contacts and close said valve means and when deenergized being operative to permit closure of said contacts and opening of said valve means.

4. In combination with a motor vehicle having a fluid cooled engine and a passanger compartment, the combination comprising, an intake manifold for said engine, a fluid cooling system for said engine, a duct having an inlet side connected with the atmosphere positioned to discharge into said passenger compartment, a heat exchanger positioned in the path of air flowing between said inlet side of said duct and said passenger compartment, means connecting said engine cooling system and said heat exchanger, a thermostatic switch positioned to sense the temperature of said cooling system, a relay including, an actuating coil, a shiftable armature and a pair of normally open relay switch contacts one of which is shiftable by said armature to cause a closure of the relay switch contacts, a damper controlling the flow of fresh air through said duct, a vacuum motor connected to move said damper, valve means operable to connect said vacuum motor with said intake manifold, said valve means being controlled by the armature of said relay and being shifted to a position connecting said vacuum motor and said intake manifold when said relay switch contacts are closed, an energizing electric circuit for said actuating coil of said relay including said thermostatic switch, an electric motor driven fan positioned in said duct, and an electric energizing circuit for said electric motor including said relay switch contacts.

References Cited in the file of this patent

UNITED STATES PATENTS

| | | |
|---|---|---|
| 1,884,256 | Rogers et al. | Oct. 25, 1932 |
| 2,187,045 | McCorkle | Jan. 16, 1940 |
| 2,265,648 | Kopp | Dec. 9, 1941 |
| 2,291,543 | Findley | July 28, 1942 |
| 2,354,345 | Wintergreen | July 25, 1944 |
| 2,406,246 | Ogden | Aug. 20, 1946 |
| 2,640,407 | Aufiero | June 2, 1953 |
| 2,691,705 | Ray | Oct. 12, 1954 |
| 2,811,314 | Lund | Oct. 29, 1957 |